United States Patent
Privett

[15] 3,667,158
[45] June 6, 1972

[54] CULTIVATION RECEPTACLE
[72] Inventor: Peter Arthur Privett, 22 Bredon Road, Croydon, England
[22] Filed: Oct. 30, 1970
[21] Appl. No.: 85,470

[30] Foreign Application Priority Data
Oct. 31, 1969 Great Britain..................53,518/69

[52] U.S. Cl..................................................47/17
[51] Int. Cl..................................................A01g 9/14
[58] Field of Search..................47/1.2, 17, 38, 38.1, 16

[56] References Cited
UNITED STATES PATENTS

| | | |
|---|---|---|
| 1,376,998 | 5/1921 | Boss..................................47/16 |
| 2,249,197 | 7/1941 | Brundin..............................47/1.2 |
| 2,917,867 | 12/1959 | Bailey................................47/1.2 |
| 3,298,133 | 1/1967 | Courtright.........................47/38.1 |
| 3,323,253 | 6/1967 | Robins...............................47/1.2 |

*Primary Examiner*—Robert E. Eagwill
*Attorney*—William Anthony Drucker

[57] ABSTRACT

A combined humidifier and plant apparatus for humidifying the atmosphere and for growing and/or displaying of plants. For the growing of plants, a tray provided in the cabinet supports a layer of soil. The soil is moisturized by a water absorbent material that is partly immersed in a water trough. The humidifying means includes a fan mounted in the cabinet that drives air and water vapor out through an outlet to humidify the atmosphere.

2 Claims, 3 Drawing Figures

3,667,158

CULTIVATION RECEPTACLE

BACKGROUND OF THE INVENTION

The invention relates to a device for humidifying the atmosphere and for growing and/or displaying plants.

SUMMARY OF THE INVENTION

According to the present invention I provide a combined humidifier and plant apparatus including a first compartment, a water trough being provided in said first compartment and a tray substantially horizontally arranged for covering the water trough and for supporting a layer of soil above the trough, a water absorbent material in said first compartment extending across said tray and down into the trough for supplying moisture to said soil to be placed on the material, a second compartment for receiving a quantity of water, an immersion heater located in said second compartment, an outlet, a fan being positioned so as to drive air and water vapor across the surface of the water in said second compartment and out through the outlet to humidify the ambient atmosphere, and an insulating bulkhead provided between said first and second compartment to prsent heat transference from water in said second compartment to the water in the first compartment.

In a preferred embodiment the apparatus includes a third compartment housing the fan. This third compartment communicates with a space at the top of the trough in the first compartment and this space in the first compartment communicates with the second compartment. In this embodiment the fan drives air and water vapor through the space in the first compartment and across the water surface in the second compartment and out through the outlet to humidify the atmosphere.

The water in the second compartment is separated from the water in the trough of the first compartment by the insulating bulkhead. This insulating bulkhead may be neoprene faced with silicone rubber.

The apparatus may include a framework having side members and top and base members. The top and base members may be U-shaped having the side members fixed therein so as to provide a rectangular shaped framework. The first, second and third compartments may be arranged in the base member of the framework.

The apparatus may include means for mounting a lamp so as to illuminate the region above the tray. The lamp used may be of type to give particular aid to plant growth, e.g. ultra violet tube. The framework may have a back panel which is slidably mounted (a mirror for example) and a front panel that is also slidably mounted and made of a transparent material.

A further feature of the invention may provide a device which uses two types of water absorbent material, or one type made up of separate parts, therefore making the device easier to assemble. At one end of the tray two tubes are provided one of which may be provided as an access for filling the enclosure trough with water and the other as a means for indicating the water level in the device, e.g. a float.

DESCRIPTION OF THE PREFERRED EMBODIMENT

Figure 1:
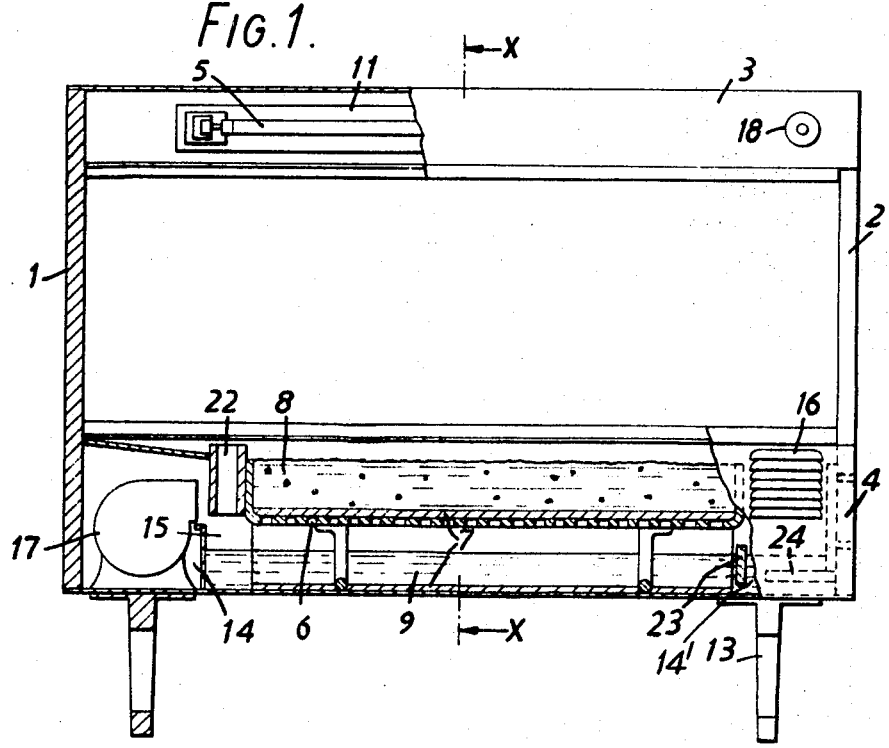
FIG. 1 is a part cross-sectional front elevation of the device in accordance with the invention.
Figure 2:
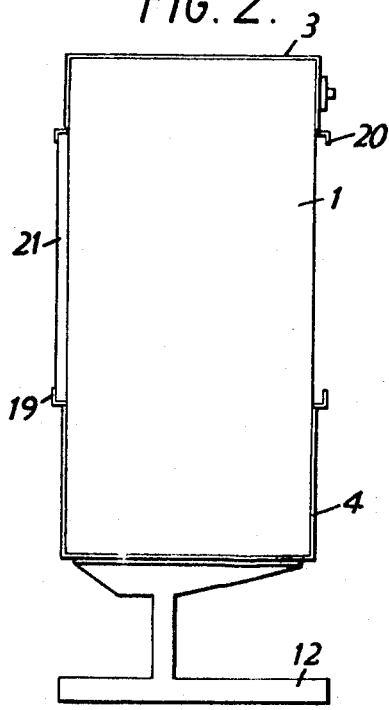
FIG. 2 is an end elevation of the device.
Figure 3:
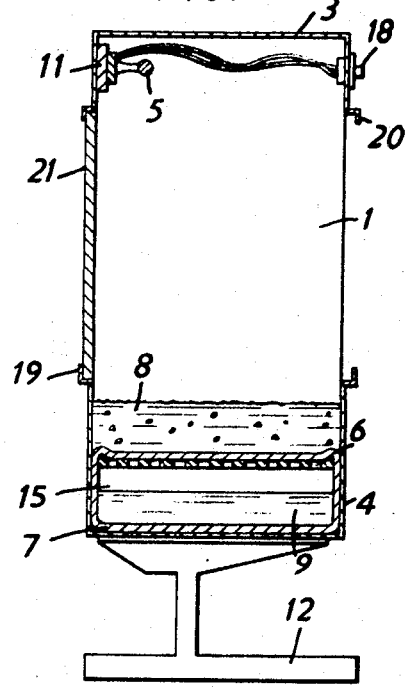
FIG. 3 is a cross-sectional view taken along the line X — X of FIG. 1.

In the example shown the combined humidifier and plant apparatus comprises a framework constructed from side member 1 and 2, and top and base members 3 and 4. The side members 1 and 2 are fixed into the U-shaped (see FIG. 2) top end base members 3 and 4 to provide a rectangular shaped framework. A lamp 5, a fluorescent tube type used in this example, is fixed inside the top member 3. A tray 6 is arranged to fit into the base member 4 of the framework, and the upper surface of the tray 6 is covered with a water absorbent material 7. The water absorbent material 7 extends across the tray 6 and down into a trough which is situated within base member 4. The tray 6 is provided with soil 8 which lies on the upper surface of the water absorbent material 7 that is on the tray 6. The trough holds a quantity of water 9.

In the example shown the fluorescent tube is mounted in the top member 3 by means of a suitable bracket 11. The framework is supported on two support members 12 and 13 which are fixed to the base member 4. Attached inside the base member one, at each end, are two end compartments 14 and 14'. Each of these compartments 14 and 14' has an upright side member which forms an end part of the trough which holds the water 9. A space 15 is left between the water 9 and the tray 6, and the framework is provided with an outlet 16. A fan 17 is provided shown mounted in the end compartment 14, but it may be mounted in either of the end compartments 14 or 14'.

The lamp 5 or fan 17 may be controlled by a switch 18 mounted in the top member 3. Both top and base members 3 and 4 are provided with channels 19 and 20, both back and front of the framework for attaching a slidable mounted panel 21 at the back of the device, and a slidable mounted panel (not shown in the drawing) at the front of the device if it is required. Two tubes 22 (only one shown) are provided in and near one end of the tray 6 arranged as shown. One may be used as an access to fill the trough with water and the other may be provided with a float (not shown) for determining the actual water level.

One of the end compartments 14' contains water which is separated from the water in the trough by an insulating bulkhead 23. This heat insulating bulkhead 23, in the particular example described, is neoprene faced with silicone rubber and is spaced about one-sixteenth inch from the base of the framework to allow water to flow from the trough into the end compartment 14'. Alternatively the bulkhead may be provided with small apertures. An immersion heater 24 is provided in the end compartment 14 containing the water, and is arranged so that it immerses into the water. The heat insulating bulkhead is provided between the trough and the end compartment 14' to prevent heat transfer from water in the end compartment 14' to the water in the trough. In the embodiment described the fan is mounted in the other end compartment 14 so that it drives air and water vapor through the space 15 between the tray and the trough, and across the surface of the water in the end compartment having the immersion heater and out through the outlet 16 to humidify the atmosphere.

The use of the back panel which could be a mirror or some type of decorative panel, and the lamp, means the apparatus can be made to look very decorative and hence enhance the possible uses of the device. Besides being employed for plant growing and humidifying the atmosphere, the invention can be used as a very attractive display apparatus, with possibly using artificial plants for special display purposes such as at an exhibition stand, theater entrance hall or similar application. The invention is not limited to any particular size or shape and needs very little attention as compared with other well known plant growth devices.

I claim:

1. A plant apparatus system including a first compartment, a water trough in said first compartment and a tray substantially horizontally arranged covering the water trough and a layer of soil in said tray above the trough, a water absorbent material in said first compartment extending across the bottom of said tray and down into the trough for supplying moisture to said soil, a second compartment receiving a quantity of water, heating means located in said second compartment, a fan positioned to one side of one of said compartments to drive air and water vapor across the surface of the water in said compartments to humidify the ambient atmosphere; and a heat insulating bulkhead provided between said first and second compartments.

2. An apparatus according to claim 1 further including fluorescent illumination means mounted above the tray.

* * * * *